Figure 1:
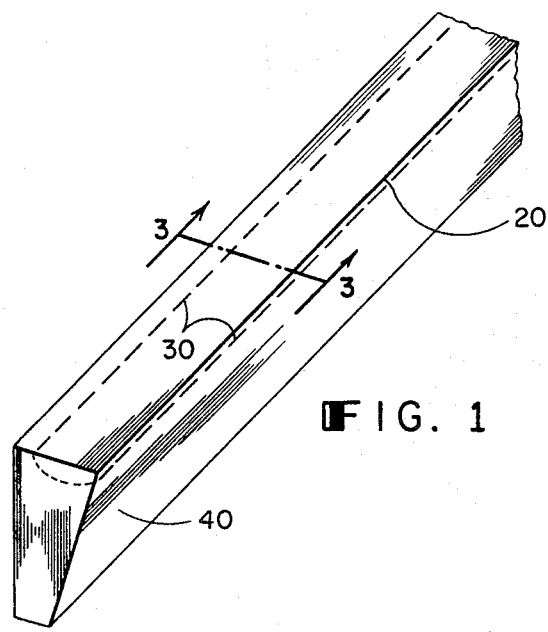

June 18, 1968   E. A. EVANCIC ET AL   3,388,618
METHOD OF MAKING A HIGH SPEED TOOL STEEL BAR
Filed June 30, 1966

United States Patent Office 3,388,618
Patented June 18, 1968

3,388,618
METHOD OF MAKING A HIGH SPEED
TOOL STEEL BAR
Ernest Andrew Evancic, Fitchburg, and Kenneth Eugene Campbell, Ashburnham, Mass., assignors to Simonds Saw and Steel Company, Fitchburg, Mass., a corporation of Massachusetts
Filed June 30, 1966, Ser. No. 561,955
4 Claims. (Cl. 76—101)

This invention relates to the formation of a durable steel cutting edge and more particularly to the formation of a heat-hardened cutting edge on a high speed tool steel bar, particularly where the bar is relatively massive, as for example in a sheeter knife used for converting rolls of paper to sheet form.

Such sheeter knives may run anywhere from five feet up to as much as twelve feet in length and have to have a sizeable cross-sectional area sufficient to provide stability for maintaining proper alignment of the cutting edge. Such sheeter knives are generally today made from bimetal stock composed of different alloys rolled together from separate melts using the harder alloy section to provide the cutting edge. Where the cutting edge alloy is chosen from the high speed tool steel series, and the bimetal bar is heat hardened all over, the product enjoys the benefits, at the cutting edge, of the high hardness and wear resistance of the heat-hardened high speed tool steel, but the hardening of such long bars is subject to furnace limitations, requiring expensive furnaces which are difficult to maintain and expensive to operate—and which represent a capital investment which has small return because of infrequent use.

Any selective hardening of the cutting edge portion of a sheeter bar formed entirely of high speed tool steel is extremely difficult by any of the normal heat hardening methods such as flame hardening because the mass of the bar provides so great a heat sink as to prevent selective hardening at the necessary high temperature approaching 2200° F. for attaining hardnesses as high as 63–65 Rockwell C in high speed tool steel.

Sheeter bars formed entirely of high speed tool steel are even more difficult to furnace harden because the all hard bar leads to a high incidence of breakage both in manufacturing and in service. Long bars of this type as well as the bimetal bars are subject to furnace limitations.

A specific object of this invention is thus to provide the trade with an economically feasible high speed tool steel sheeter knife which has a cutting edge which has been fully heat-hardened to a Rockwell C hardness of the order of 63–65 without the use of long furnaces.

A further object of the invention is to provide generally a method for fully heat-hardening high speed tool steel in restricted selected zones thereof, to a depth permitting multiple resharpenings without bringing the entire bar to heat-hardening temperature.

It is a further object of the invention to accomplish heat-hardening of high speed tool steel stock in selected zones by actually melting the steel in said zones without detrimentally deforming the stock.

The above and other objects of the invention are secured by subjecting the top of high speed tool stock progressively along its length to a melting heat in such manner progressively to melt the stock to a controlled depth and resulting width which lies between and is spaced inwardly from the side walls of the stock while maintaining marginal portions of the stock along its side walls unmelted so that the unmelted stock acts in the manner of a dam or basin to retain the liquefied metal, while it is melted, within its original confines until it resolidifies. The progressive movement of the heat along the top of the bar permits the melted stock to cool rapidly as the source of heat is withdrawn by the progression. Thereafter after tempering, marginal side portions of the stock where unmelted are removed to expose a new side wall surface of previously melted resolidified and hence hardened stock which terminates at an exposed top edge which is longitudinally embraced by and lies wholly within the confines of the resolidified zone.

Such heat may be supplied with the use of an electron beam gun or plasma torch but a preferred apparatus is one that produces an inert gas shielded arc such as used in the present day TIG welding operation as described in the bulletin of Welding Research Council of the Engineering Foundation, 29 W. 39th St., New York City, July 1961. The use of such an arc has the advantage of minimizing oxidation of the liquefied steel and provides a heat source which may be readily moved relative to the long bar stock and whose heat output can be territorially controlled to assure, when taken in connection with the speed of progression, proper control of the volume of the melt.

Figures 2, 3:
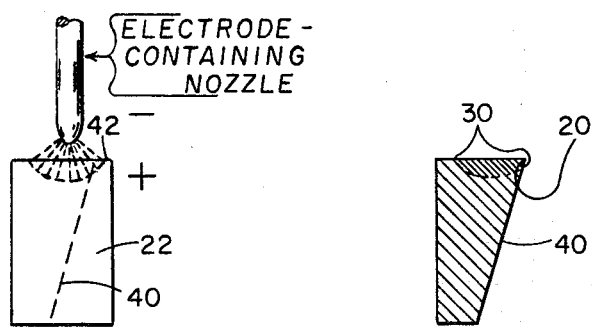

Products of this invention and their method of manufacture can be readily understood by reference to the accompanying drawings wherein:

FIG. 1 illustrates a section of a steel sheeter knife having a straight cutting edge at 20. The dotted lines in FIG. 1 indicate the borders of a heat-hardened zone 30 of the bar within which the cutting edge 20 lies, the bottom portion of the bar not being fully heat-hardened and therefore retaining greater toughness than that of the heat-hardened zone 30;

FIG. 2 indicates the method of making the knife of FIG. 1 and involves the use of an oversized stock bar composed for example, of M2 high speed tool steel.

FIG. 3 is a cross section on line 3—3 of FIG. 1. As shown in FIG. 2 the side walls of the oversize bar stock and an arc is struck between the electrode and the work piece in such manner as to melt the steel lying within the arcuately bottomed zone which lies between the side walls and spaced inwardly from the forward side face of the bar stock by an intervening lip 42 which acts as a dam to retain any of the steel which is liquefied. The width of lip 42 is exaggerated in the drawings for purposes of clarification.

In a bar stock which has a width of ¾ inch it has been found that the torch can readily melt down to a depth of about ¼ inch and as the torch moves along the bar, the liquefied steel quickly solidifies as it is air quenched. Thereafter the bar is tempered in accordance with normal practice, whereupon the bar is then ground or cut away to form the cutting edge 20 exposing the new side wall surface 40 which intersects the top surface at the cutting edge 20 forming the final product as shown in FIG. 3 with the cutting edge 20 lying wholly within the confines of the resolidified zone 30 which has a Rockwell hardness of 63–65 as the result of the application of melting heat above 2200° F., followed by tempering. At some stage of the operation subsequent to the melting the ends of the bar are trimmed if the hardened cutting edge is intended to be co-extensive with the length of the bar. Where one utilizes the TIG heating apparatus, the extent of the hardened zone may be readily controlled, depending upon the electrode size, the shielding gas, the electrode stick out, the electrode work distance, the ampere and voltage settings, the rate and path of progression, all as determined by a skilled operator. With proper settings, a speed of progression of 4 inches per minute has been attained with M2 steel with a fully hardened zone depth approaching ¼ inch.

The cutting edge is comprised of fully heat-hardened high speed tool steel which can be multiply resharpened without lessening the degree of hardness in the new edge, since the selected zone 30 is of equal hardness throughout, unlike the gradated hardness which results from case hardening or flame treatment. Finally, the method is so simple and so controllable that despite the fact that the bar stock is composed wholly of more expensive high speed tool steel much of which is subsequently ground off, the sheeter knives may still be more economically produced than knives which require the greater number of operations accompanying production from bimetal separate melt composites.

What is claimed is:

1. That method of forming a high speed tool steel bar having a selected heat-hardened zone longitudinally embracing an edge of said bar which includes the steps of heating the top of an oversize bar of high speed tool steel progressively lengthwise of the bar to melt the bar to a controlled depth progressively along a zone lying between and spaced inwardly from the side walls of said bar while maintaining said side walls unmelted, cooling the melted stock progressively lengthwise of the stock to resolidify the stock in said zone and thereafter removing marginal side wall portions of said stock to form a newly exposed side wall surface having a top edge lying within the confines of said resolidified zone.

2. The method as claimed in claim 1 wherein said top edge is a straight knife edge.

3. A method as claimed in claim 1 wherein said heat is generated by an inert gas shielded electric arc and wherein said arc is moved progressively along the top of said oversize bar and said melted stock is air quenched.

4. A method as claimed in claim 1 wherein said melted zone is arcuately bottomed transversely of said bar and has a maximum depth of the order of ¼ inch.

No references cited.

GRANVILLE Y. CUSTER, JR., *Primary Examiner.*